(No Model.)   2 Sheets—Sheet 2.

A. C. BOWEN.
AMALGAMATOR.

No. 301,557.   Patented July 8, 1884.

Witnesses,
Geo. H. Strong.

Inventor
A. C. Bowen
By Dewey & Co.
Attorneys

UNITED STATES PATENT OFFICE.

AUGUSTUS C. BOWEN, OF MICHIGAN BLUFF, CALIFORNIA.

AMALGAMATOR.

SPECIFICATION forming part of Letters Patent No. 301,557, dated July 8, 1884.

Application filed December 4, 1883. (No model.)

*To all whom it may concern:*

Be it known that I, AUGUSTUS C. BOWEN, of Michigan Bluff, county of Placer, and State of California, have invented an Improvement in Amalgamators; and I hereby declare the following to be a full, clear, and exact description thereof.

My invention relates to certain improvements in apparatus in which the grinding or reduction of ores and the amalgamation of any precious metal which may be contained therein may be accomplished.

It consists of a pan of considerable diameter having the rim and center raised, so that there will be an annular channel with a curved bottom around the periphery, within which heavy balls are caused to travel by a rolling motion of the pan about its center of support, and in combination therewith of a mechanism for adjusting the angle of inclination of the axis of the pan, removable dies for the interior of the pan, and certain details of construction, all of which will be more fully explained by reference to the accompanying drawings, in which—

Figure 1:
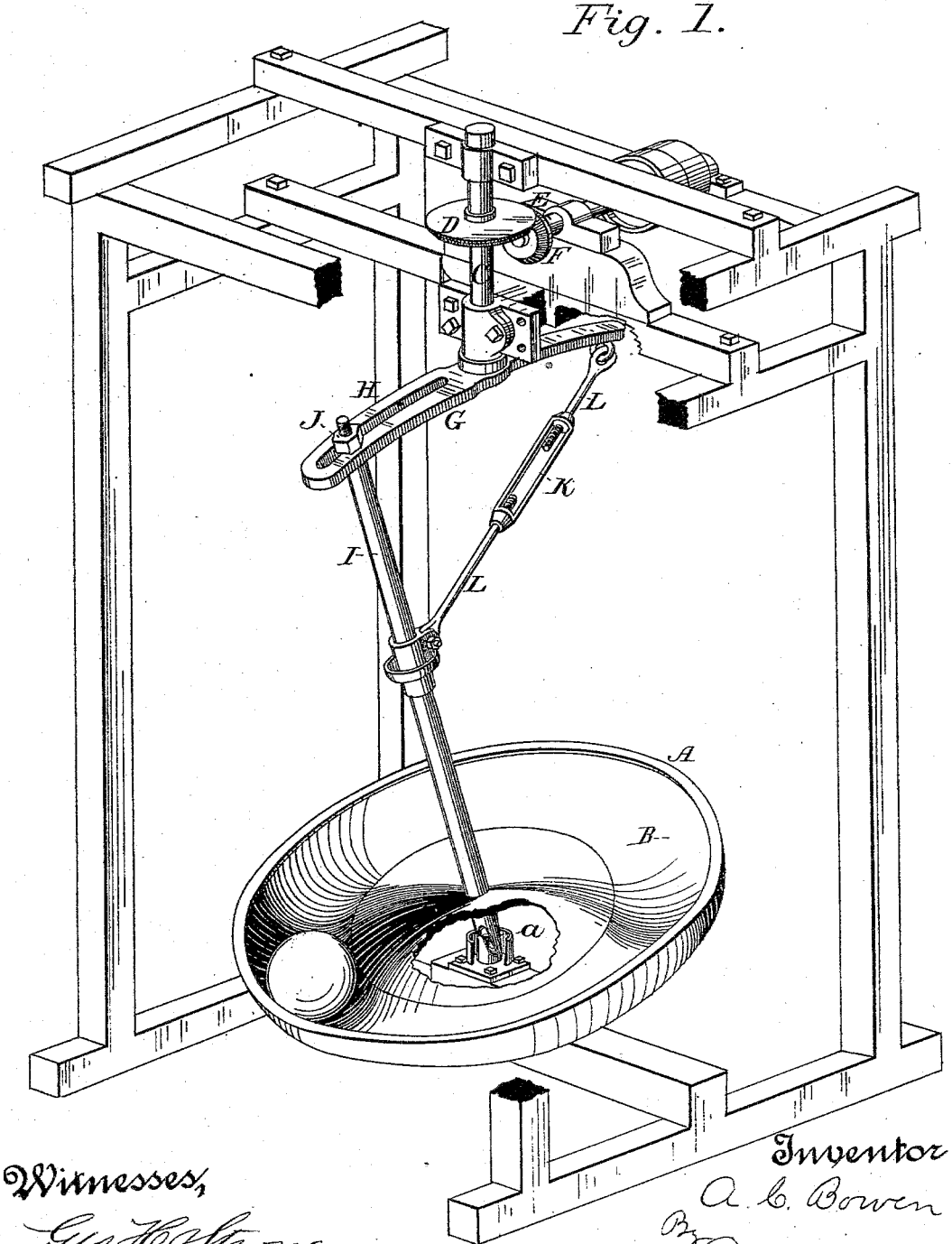
Figure 2:
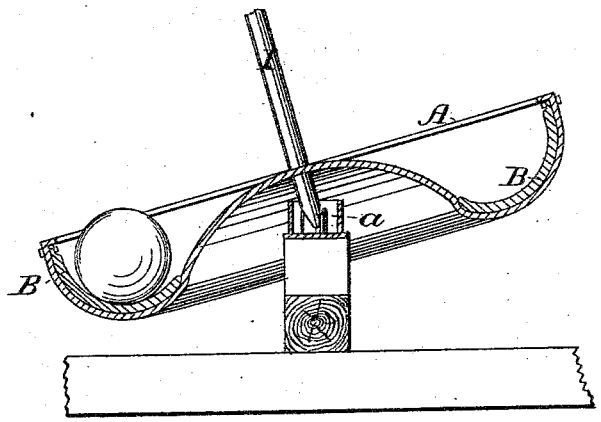

Figure 1 is a perspective view of my pan and the adjusting apparatus. Fig. 2 is a vertical section of the pan and dies.

A is the pan, having the center and sides raised, so as to form a channel around the inside of the pan, within which heavy balls are placed and caused to travel by moving the pan around a central pivot or forked joint, $a$, as described in my former patent of January 30, 1883, No. 271,305. In the present case the grooved depression is formed to admit dies B, which are fitted in sections, so as to be easily removed and replaced by others when worn out. Above the pan at a considerable height is a vertical shaft, C, turning in journal-boxes, and having a bevel-gear, D, fixed to it, and a horizontal shaft, E, with a corresponding bevel-gear, F, serves to drive it.

In order to connect the vertical shaft C with the pan, and to adjust the angle of the axis of the latter, an arc, G, is fixed to the lower end of the shaft C. This arc may be made of iron, and forms a curve about the universal-joint step below the pan and about which it turns. The arc is slotted lengthwise, as shown at H, and the upper end of the axis or shaft I, which passes through the pan, has a small stem passing through the slot, with a nut, J, above, which may be screwed down solid, and thus clamp the upper end of the shaft I to the arc at any point desired. This determines the angle of the shaft I, and that of the pan and its motion about a vertical line.

K is a turn-buckle connected by rods L with the shaft I and the end of the arc G, and by its use any desired amount of tension may be produced to steady and support the center of the shaft I. The turn-buckle and rods serve to hold the shaft I at the desired angle and prevent its upper end from sliding outward in the slot H.

Having thus described my invention, what I claim as new, and desire to secure by Letters Patent, is—

An amalgamator having a peripheral groove or channel, within which balls may travel, a vertical shaft, and a slotted arc, to which the upper end of the pan-shaft is adjustably connected, in combination with a turn-buckle and rods connecting the center of the pan-shaft with the outer end of the arc, substantially as herein described.

In witness whereof I have hereunto set my hand.

AUGUSTUS C. BOWEN.

Witnesses:
 S. H. NOURSE,
 C. D. COLE.